Jan. 1, 1946.    J. WILKEN    2,392,208
PORTABLE SCRUBBING BUCKET
Filed May 18, 1944
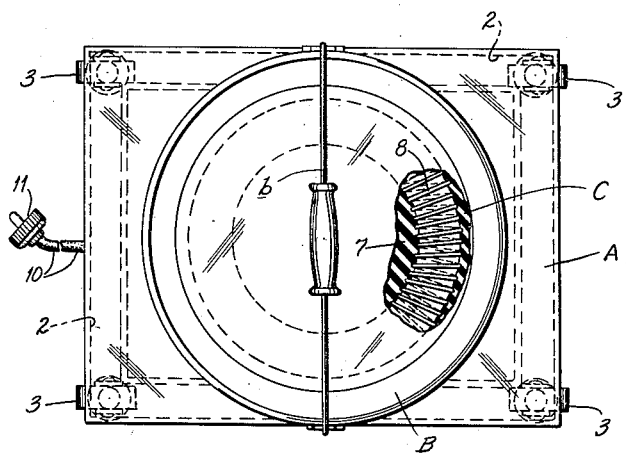
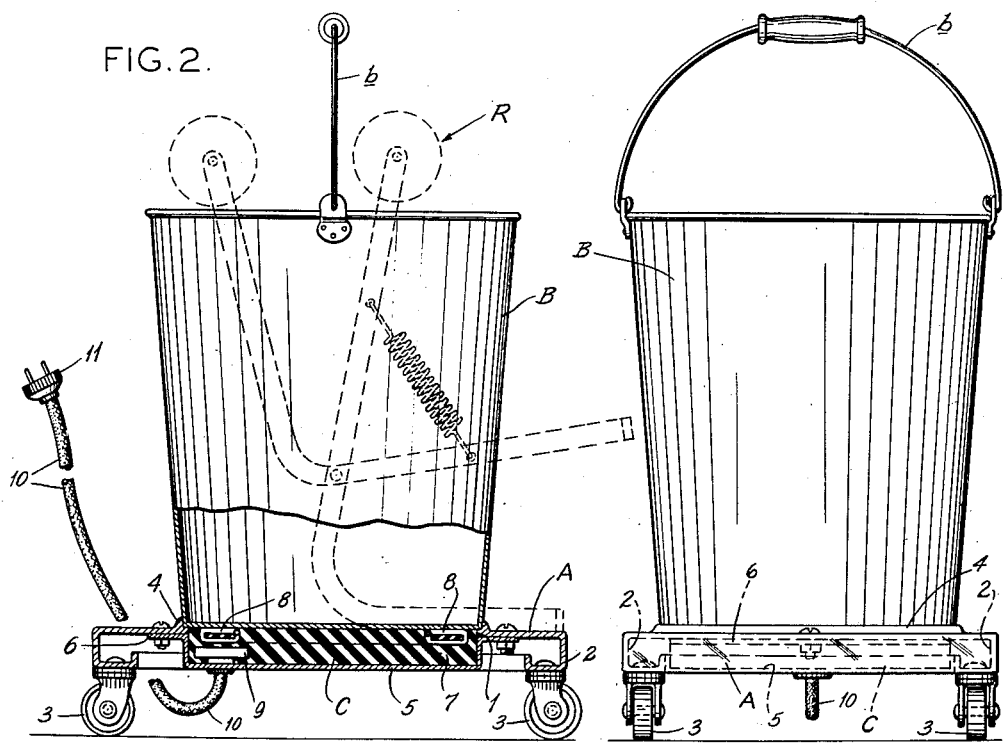
INVENTOR
JOHN WILKEN
BY Alfred W Petchaft
ATTORNEY Patented Jan. 1, 1946

2,392,208

UNITED STATES PATENT OFFICE 2,392,208

PORTABLE SCRUBBING BUCKET

John Wilken, East St. Louis, Ill.

Application May 18, 1944, Serial No. 536,115

3 Claims. (Cl. 219—43)

This invention relates to a certain new and useful improvement in portable scrubbing buckets.

Scrubbing buckets of the hand carried type normally used for every day household purposes are not satisfactory for commercial scrub-work. In bars, restaurants, hotel lobbies, and similar places, it is necessary to use extremely hot water, but sources of hot water are usually so far from the place where the scrubbing is to be done that the water cools off while it is being carried to the place where the work is to be done. In addition to this, the constant rinsing and squeezing of the mop brings a great quantity of the water into contact with air and the resultant heat losses by radiation and evaporation chill the water very rapidly.

It is the primary object of the present invention, therefore, to provide a scrubbing bucket which is readily portable and automatically heated so that the scrub-water is always kept at optimum temperature.

It is a further object of the present invention to provide a scrubbing bucket of the type stated which is simple and economical in construction and is provided with a rugged, durable carriage by which it may be easily pushed from place to place.

And with the above and other objects in view, my invention resides in the novel features of form, construction, arrangement, and combination of parts presently described and pointed out in the claims.

In the accompanying drawing:

Figure 1 is a plan view, partly broken away and in section, of a portable scrubbing bucket of my invention;

Figure 2 is a side elevational view, also partly broken away and in section, of the portable scrubbing bucket; and Figure 3 is an end view of the portable scrubbing bucket.

Referring now more in detail and by reference characters to the drawing, which illustrates a preferred embodiment of my invention, the portable scrubbing bucket comprises a base or carriage A, which is in the form preferably of a rectangular plate provided within its area with a circular opening, as at 1, and marginally provided with an integral downwardly turned and rolled channel 2 suitably provided at each of the four corners with casters or rollers 3. Upon its upper face and around the margin of the opening 1, the carriage A is provided with an upstanding rim or retaining flange 4.

B designates a bucket or tank conforming at its base approximately with the opening 1 and suitably held upon the base A by engagement within the retaining flange 4. Disposed beneath the opening 1, is a shallow pan-shaped member 5 having an outwardly presented radial rim or flange 6 by which it is bolted to the base A, and housed within the chamber thus provided by the base of the bucket and the member 5, is an electric heating element C consisting of a ceramic plate 7 shaped to fit snugly within the member 5, and having imbedded therein a heating coil 8 connected to a conventional thermostatic switch 9, which is in turn connected to a conducting cord 10 provided with a plug 11 for connection with a suitable source of electrical energy.

The portable scrubbing bucket thus may be very conveniently shifted to a desired location and connected with a source of electrical current, so that the contents may be maintained at a desired temperature and at the desired location.

Preferably, as shown, the bucket B is provided with a suitable bail $b$ for convenience in moving the structure from place to place and may also be optionally equipped with a conventional wringer R for removing surplus water from a mop or the like, as indicated in dotted lines in Figure 2.

It should be understood that changes and modifications in the form, construction, arrangement, and combination of the several parts of the portable scrubbing bucket may be made and substituted for those herein shown and described without departing from the nature and principle of my invention.

Having thus described my invention, what I claim and desire to secure by Letters Patent is:

1. A portable scrubbing bucket including a carriage mounted upon casters for convenient portability and transference from place to place and having an aperture rimmed with an upstanding flange, a bucket removably mounted in and held by said flange, a pan-shaped member mounted on the underside of the carriage beneath the aperture, and electric heating means disposed within the pan-shaped member.

2. A portable scrubbing bucket comprising, in combination, a carriage having a thin plate-like frame provided in its upper face with a shallow circular recess having a flat bottom wall and at its corners with casters by which the frame may be movably supported on the floor, an electric heating element mounted in the bottom wall of the recess, and a scrubbing bucket having a bottom portion fitting snugly in the recess and resting directly upon the heating element.

3. For use with a scrubbing bucket, a carriage comprising a thin plate-like frame provided in its upper face with a shallow circular recess having a flat bottom wall and at its corners with casters by which the frame may be movably supported on the floor, and an electric heating element mounted in the bottom wall of the recess, said recess being dimensioned for snugly engaging the bottom portion of the bucket.

JOHN WILKEN.